US010078244B2

(12) United States Patent
Hsu et al.

(10) Patent No.: US 10,078,244 B2
(45) Date of Patent: Sep. 18, 2018

(54) DIRECT-LIT TYPE BACKLIGHT SOURCE AND LIQUID CRYSTAL TELEVISION

(71) Applicant: KAISTAR Lighting (Xiamen) Co., Ltd., Xiamen (CN)

(72) Inventors: Jenn-Yuan Hsu, Xiamen (CN); Sheng-Lung Tsai, Xiamen (CN); Hsin-Yu Chiang, Xiamen (CN)

(73) Assignee: KAISTAR LIGHTING (XIAMEN) CO., LTD., Xiamen (CN)

( * ) Notice: Subject to any disclaimer, the term of this patent is extended or adjusted under 35 U.S.C. 154(b) by 0 days.

(21) Appl. No.: 15/390,508

(22) Filed: Dec. 25, 2016

(65) Prior Publication Data
US 2017/0108738 A1    Apr. 20, 2017

(30) Foreign Application Priority Data

Jan. 5, 2016 (CN) .......................... 2016 1 0004516

(51) Int. Cl.
*G02F 1/1335* (2006.01)
*H04N 5/64* (2006.01)
*F21V 5/08* (2006.01)
*F21V 5/00* (2018.01)

(52) U.S. Cl.
CPC ........ *G02F 1/133606* (2013.01); *F21V 5/007* (2013.01); *F21V 5/08* (2013.01); *G02F 1/133603* (2013.01); *G02F 2001/133607* (2013.01); *H04N 5/64* (2013.01)

(58) Field of Classification Search
CPC ......... G02F 1/133606; G02F 1/133603; G02F 2001/133607; F21V 5/08; F21V 5/007
See application file for complete search history.

(56) References Cited

U.S. PATENT DOCUMENTS

| 9,104,065 | B2* | 8/2015 | Baba ................ G02F 1/133603 |
| 9,448,436 | B2* | 9/2016 | Sakai ............... G02F 1/133603 |
| 2009/0032827 | A1* | 2/2009 | Smits ............... G02F 1/133603 257/89 |
| 2012/0092592 | A1* | 4/2012 | Imajo .............. G02F 1/133603 349/62 |

FOREIGN PATENT DOCUMENTS

TW        201329582 A1    7/2013

\* cited by examiner

*Primary Examiner* — William N Harris
(74) *Attorney, Agent, or Firm* — Hemisphere Law, PLLC; Zhigang Ma

(57) ABSTRACT

A direct-lit type backlight source includes a backplate and a point light source array disposed on the backplate. A light output shape of a first optical lens employed by each of point light sources of corner regions of the point light source array and that of a second optical lens employed by each of a plurality of point light sources of the non-corner region are different. For instance, the light output shape of the first optical lens is symmetrical in a first direction and asymmetrical in a vertical second direction. Moreover, a liquid crystal television adopting the direct-lit type backlight source is provided. The light-output shape of the optical lens adopted by each of the point light sources of the respective corners is designed to illuminate the corners uncovered by light source in the prior art, which can improve optical uniformity of the corners.

18 Claims, 7 Drawing Sheets

DIRECT-LIT TYPE BACKLIGHT SOURCE AND LIQUID CRYSTAL TELEVISION

CROSS-REFERENCE TO RELATED APPLICATION

This application is based on and claims priority to Chinese Patent Application No. 201610004516.2, filed on Jan.5, 2016, the disclosure of which is hereby incorporated by reference in its entirety.

TECHNICAL FIELD

The disclosure relates to backlight and liquid crystal display, and more particularly to a direct-lit type backlight source and a liquid crystal television.

DESCRIPTION OF RELATED ART

A common issue of a direct-lit type backlight source of a conventional liquid crystal television is: light uniformity of four corners of a TFT liquid crystal panel is not as qualified as that of the center of the TFT liquid crystal panel, as shown in FIG. 1, the four corners (positions pointed by four ellipses in FIG. 1) have obvious shadows, which would lead to a poor performance of the liquid crystal television in display.

Referring to FIG. 2, FIG. 2 is a schematic view of light output status of a direct-lit type backlight source of a conventional liquid crystal television on sale. In FIG. 2, the direct-lit type backlight source includes a backplate 21 and three light bars 23 disposed on the backplate 21, each light bar 23 is disposed with six point light sources 232 and thereby form a point light source array of 3×6, a light output shape (also referred to as light output pattern) of each of the point light sources 232 is round (shown as dotted circles in FIG. 2). Specifically, each of the point light sources 232 typically includes a secondary optical lens and a light-emitting element such as a LED covered by the secondary optical lens. A perspective structure of the optical lens is for example as shown in FIG. 3 and a stimulation view of whose light output shape is as shown in FIG. 4. Moreover, it can be seen clearly from FIG. 2 that the light-mixing effect on the four corners is the weakest, which can cause the problem that the four corners of the TFT liquid crystal panel shown in FIG. 1 have apparent shadows.

Therefore, it is necessary to provide an improved solution to solve optical unevenness on the four corners of the direct-lit type backlight source of the liquid crystal television and thereby improve display effect of the liquid crystal television.

SUMMARY

In order to overcome drawbacks and shortcomings in the prior art, the disclosure provides an improved direct-lit type backlight source and a liquid crystal television adopting the same.

Specifically, a direct-lit type backlight source provided by an embodiment of the disclosure includes a backplate and a point light source array disposed on the backplate. A light output shape of a first optical lens employed by each point light source of a plurality of corner regions of the point light source array and that of a second optical lens employed by a plurality of point light sources of non-corner regions of the point light source array are different.

In an embodiment of the disclosure, the light output shape of the first optical lens is rectangular.

In an embodiment of the disclosure, the light output shape of the second optical lens is for example round.

In an embodiment of the disclosure, the light output shape of the first optical lens is for example symmetrical in a first direction and a second direction, wherein the first direction and the second direction are mutually perpendicular.

In an embodiment of the disclosure, the light output shape of the first optical lens is symmetrical in a first direction and asymmetrical in a second direction, wherein the first direction and the second direction are mutually perpendicular.

In an embodiment of the disclosure, the light output shape of the second optical lens is rectangular and symmetrical both in the first direction and the second direction.

Furthermore, a direct-lit type backlight source provided by another embodiment of the disclosure includes a backplate and a point light source array disposed on the backplate. Light output shapes of optical lenses respectively employed by each point light source of a plurality of corner regions and a plurality of point light sources of non-corner regions of the point light source array are both rectangular, light emission in a first direction is symmetrical and light emission in a second direction is asymmetrical, wherein the first direction and the second direction are perpendicular.

Furthermore, an embodiment of the disclosure further provides a liquid crystal television, including any one of the direct-lit type backlight sources described above.

In an embodiment of the disclosure, the backplate is a curved backplate.

It can be known from the above that the light output shapes of the optical lenses adopted by the point light sources of each of the corners of the point light source array in the direct-lit type backlight source are designed according to the embodiments of the disclosure, so that corners can be covered by the light source to improve optical uniformity of the corners.

By the following detailed description with reference to accompanying drawings, other aspects and features of the disclosure will become apparent. However, it should be understood that, the drawings only are for the purpose of explanation and not as limiting the scope of the disclosure. It also be appreciated that, unless otherwise indicated, the drawings are not necessarily drawn to scale, they are merely trying to conceptually illustrate the structures and processes described herein.

BRIEF DESCRIPTION OF THE DRAWINGS

In the following, with reference to accompanying drawings, concrete embodiments of the disclosure will be described in detail.

FIG. 8b is a top view of the optical lens shown in FIG. 8a.

FIG. 8c is a simulation outcome view of a light output shape of the optical lens shown in FIG. 8a.

DETAILED DESCRIPTION OF PREFERRED EMBODIMENTS

Embodiments of the disclosure will be described in detail with reference to the accompanying drawings as follows to better understand the previously mentioned objectives, features and advantages of the disclosure.

Figure 2:
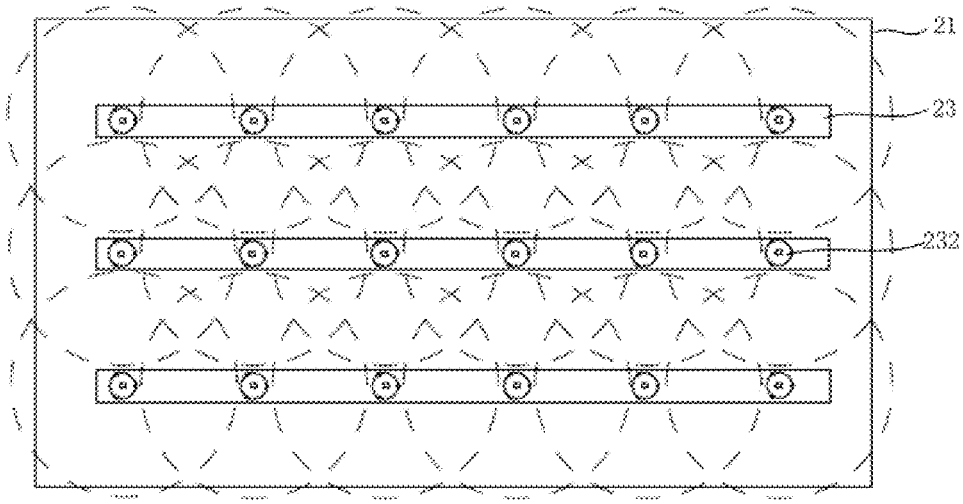
FIG. 2 is a schematic view of a light output status of a direct-lit type backlight source of the liquid crystal television in the prior art.
Figure 3:
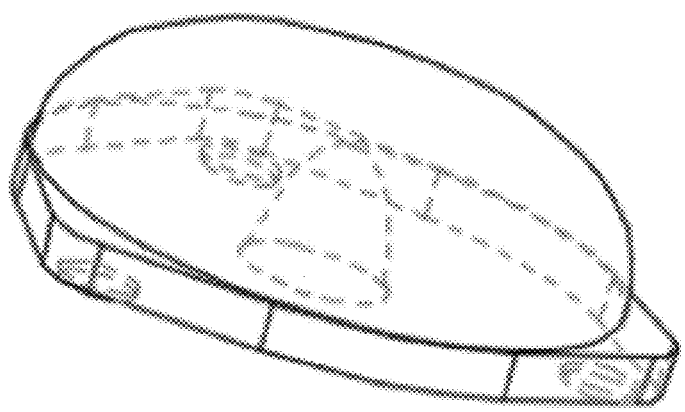
FIG. 3 is a perspective structural schematic view of an optical lens of point light sources shown in FIG. 2.
Figure 4:
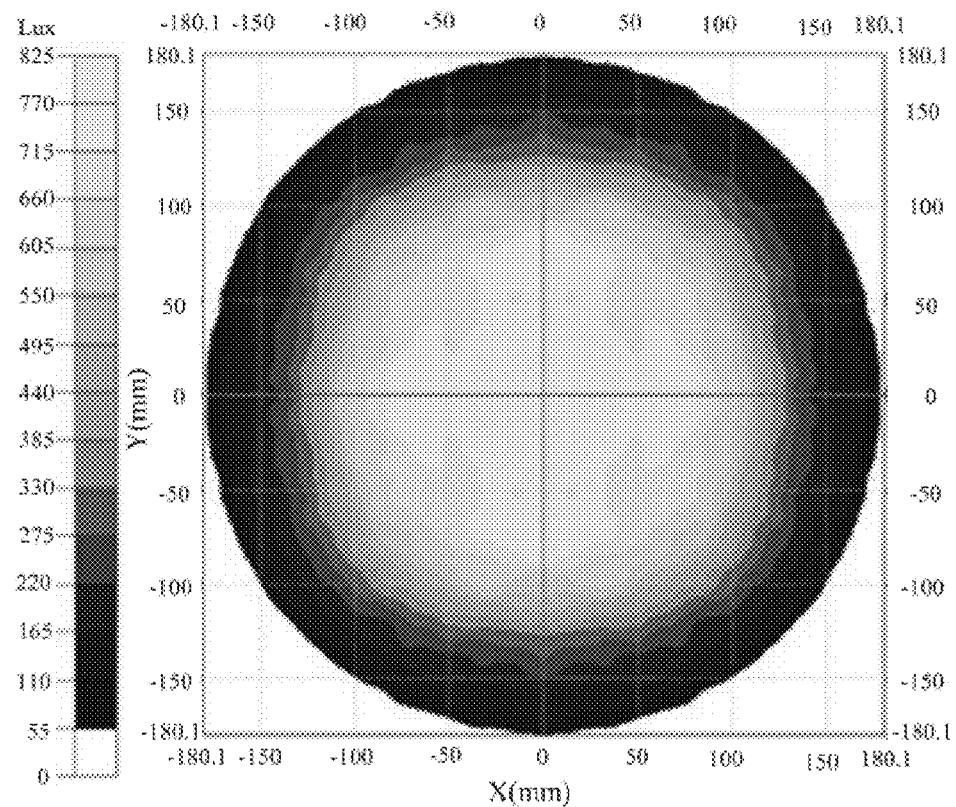
FIG. 4 is a simulation view of a light output shape of the optical lens shown in FIG. 3.
Figure 5:
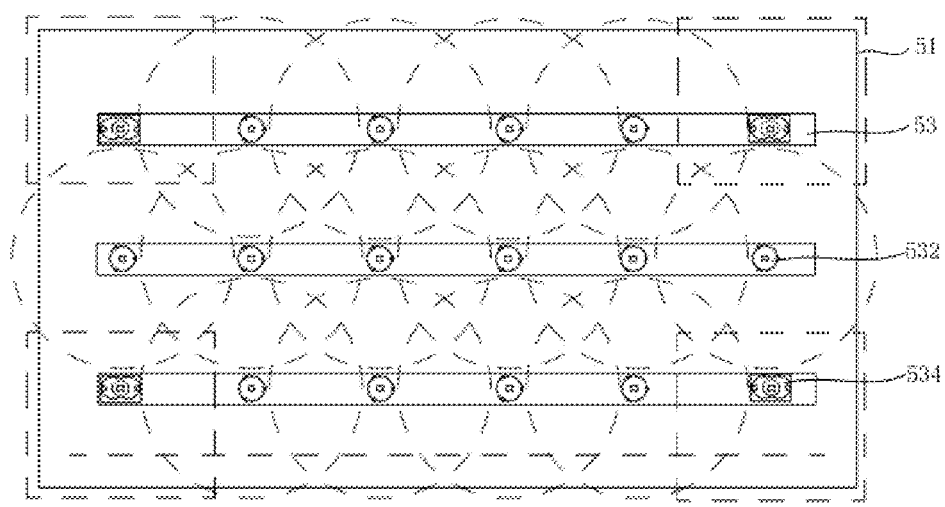
FIG. 5 is a schematic view of a light output status of a direct-lit type backlight source provided by an embodiment of the disclosure.
Figure 6:
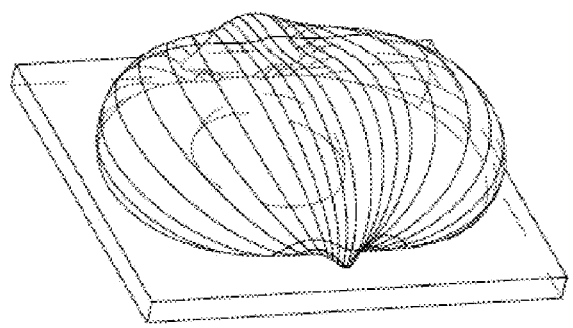
FIG. 6 is a perspective structural schematic view of an optical lens adopted by point light sources located at four corners of the direct-lit type backlight source shown in FIG. 5.
Figure 7:
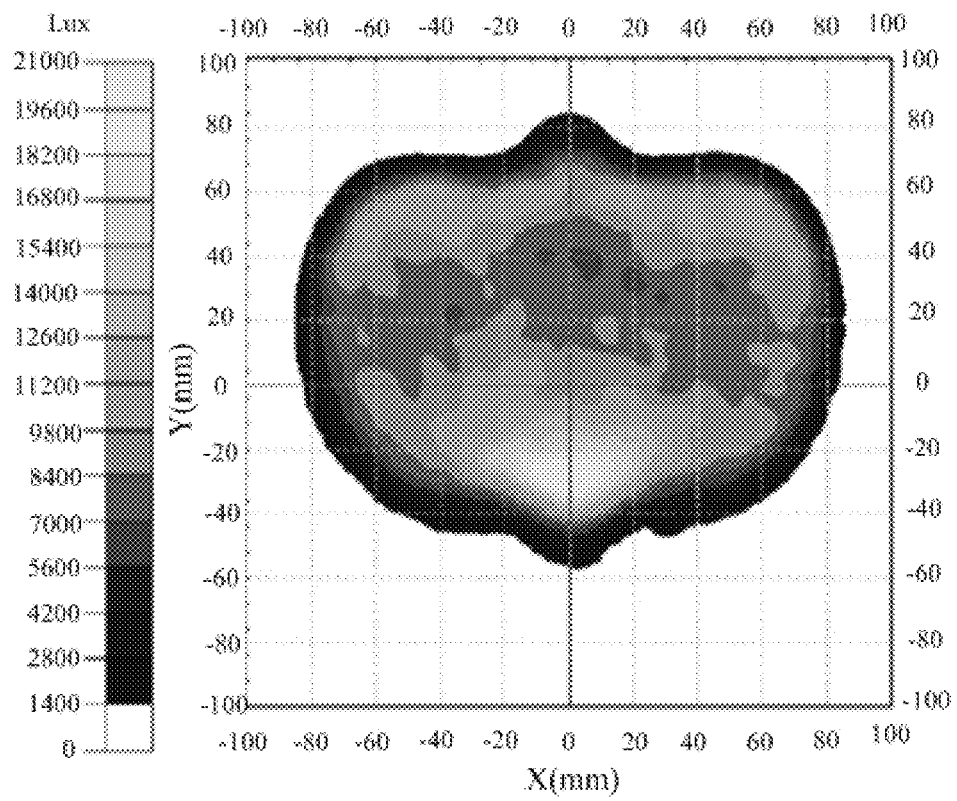
FIG. 7 is a simulation view of a light output shape of the optical lens shown in FIG. 6.

Referring to FIG. 5, FIG. 5 is a schematic view of a light output status of a direct-lit type backlight source provided by an embodiment of the disclosure. As illustrated in FIG. 5, the backlight source includes a backplate 51 and three light bars 53 disposed on the backplate 51 (e.g., equally-spaced disposed on the backplate 51 as shown in FIG. 5), each light bar 53 is disposed with six point light sources, thereby form a point light source array of 3×6. The point light source array of 3×6 shown in FIG. 5 is a rectangular array, which includes four point light sources 534 respectively located at four corners and fourteen point light sources 532 located at the non-corner region. The point light sources 532 each adopt the point light source shown in FIG. 2 and include a light source such as a LED and an optical lens covering the light source, and a light output shape (also referred to as light output pattern) of the optical lens (a second optical lens) of each of the point light sources 532 is round (shown as dotted circles in FIG. 5). The point light sources 534 and the point light sources 532 adopt different optical lenses in shape, and a light output shape of the optical lens of each of the point light sources 534 is rectangular (shown as dotted rectangles in FIG. 5). To be more specific, a perspective structural schematic view of the optical lens (a first optical lens) of each of the point light sources 534 is for example as shown in FIG. 6, and FIG. 7 is a simulation view of a light output shape of the optical lens shown in FIG. 6. It can be learned from FIG. 7 that the light output shape of the optical lens of each of the point light sources 534 is approximately rectangular, which is bilaterally symmetric irradiation with respect to 0 axis along a direction of X axis (i.e., horizontal direction in FIG. 7, also is the lengthwise direction of the light bar 53 in FIG. 5), and irradiates asymmetrically along a direction of Y axis (vertical direction in FIG. 7) with respect to 0 axis, identically the light output shape has a long side and a short side in the direction of Y axis.

Figure 1:
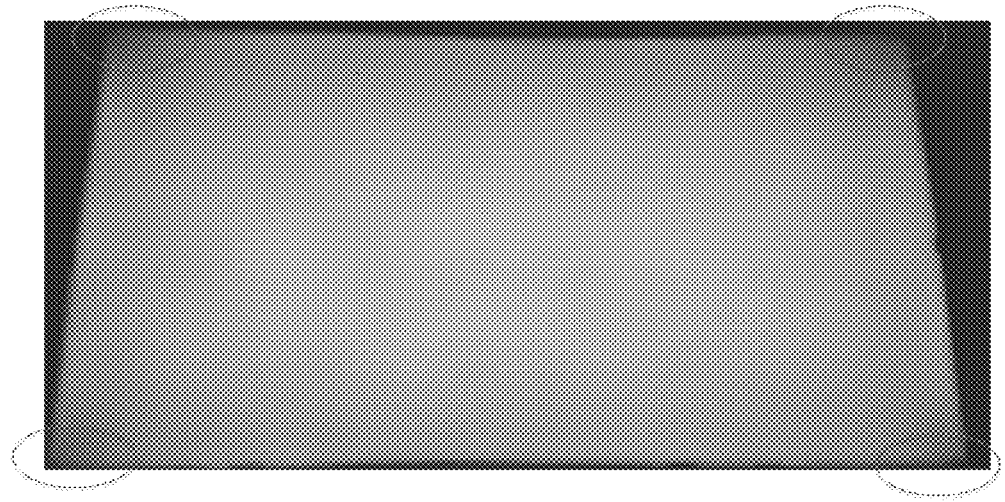
FIG. 1 is a photograph of a white image display effect of a liquid crystal television in the prior art.

Accordingly, as the light output shape of the optical lens adopted by the point light sources 534 located at respective corners in the point light source array of the embodiment is designed to be symmetrical in the first direction and asymmetrical in the second direction, four corners uncovered by the light source in FIG. 1 has been illuminated, so that optical uniformity at corners can be improved with respect to the prior art.

Figure 8A:
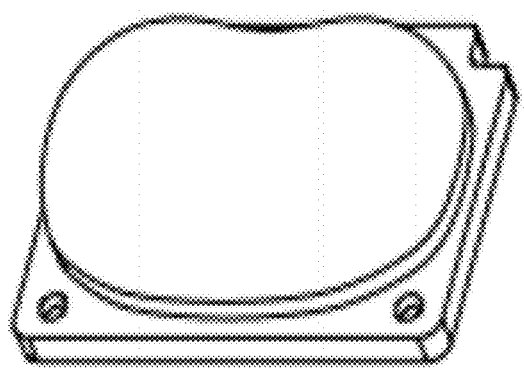
FIG. 8a is a perspective structural schematic view of an optical lens of point light sources of four corners applied in another direct-lit type backlight source according to an embodiment of the disclosure.
Figure 8B:
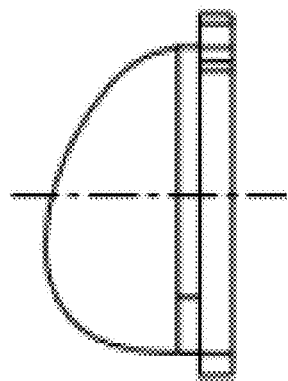
Figure 8C:
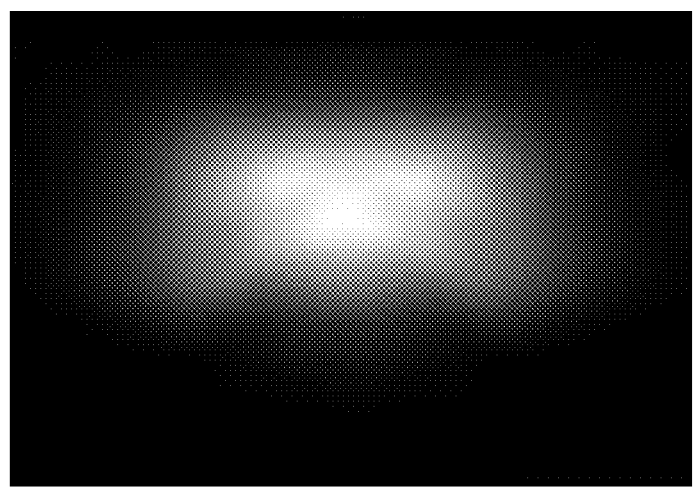

Furthermore, the optical lens adopted by each of the point light sources 534 shown in FIG. 5 is not restricted to the optical lens shown in FIG. 6, other optical lens that can form a rectangular light output shape with asymmetrical light output in one direction is available as well, such as an optical lens shown in FIG. 8a and FIG. 8b. Specifically, the optical lens shown in FIG. 8a and FIG. 8b is bilaterally symmetric (i.e., symmetric on the direction from left to right) and asymmetric on the direction from front to rear, and a light output shape formed by which is shown in FIG. 8c. It can be seen clearly from FIG. 8c that the light output shape is approximately rectangular, symmetrical in the horizontal direction while asymmetrical in the vertical direction.

Figure 9:
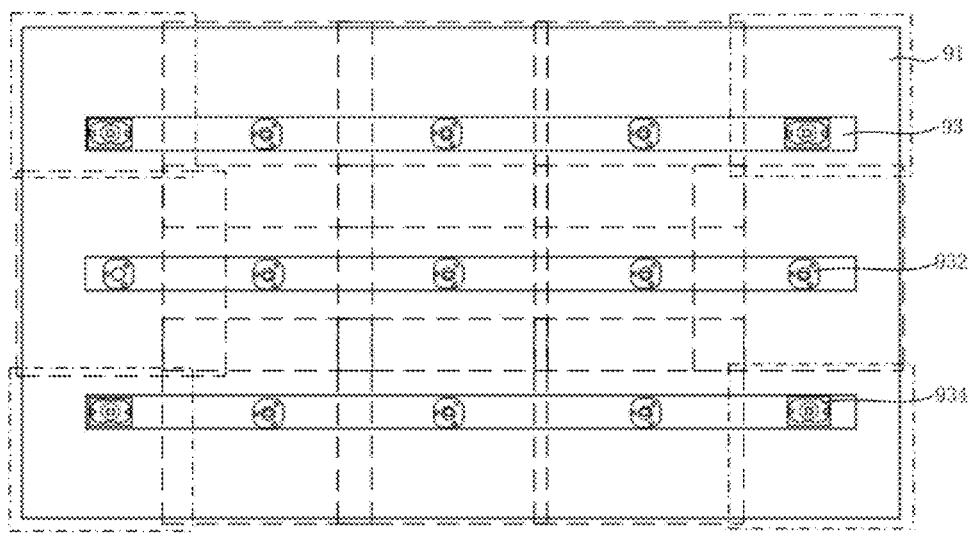
FIG. 9 is a schematic view of a light output status of further another direct-lit type backlight source provided by an embodiment of the disclosure.

Referring to FIG. 9, FIG. 9 is a schematic view of a light output status of another direct-lit type backlight source provided by an embodiment of the disclosure. In FIG. 9, the backlight source includes a backplate 91 and three light bars 93 disposed on the backplate 91 (e.g., equally-spaced disposed on the backplate 91 as shown in FIG. 9), each of the light bar 93 is disposed with five point light sources, and thereby form a point light source array of 3×5. The point light source array of 3×5 shown in FIG. 9 is a rectangular array, which includes four point light sources 934 respectively located at four corners and eleven point light sources 932 located at the non-corner region. A light output shape of the optical lens adopted by each of the point light sources 932 is rectangular and symmetrical in the horizontal direction as well as in the vertical direction (shown as dotted rectangles in FIG. 9), the specific structure of the optical lens is in the understood range of the skilled in the art and thus will not be repeated herein. The point light sources 934 and the point light sources 932 adopt different optical lenses, the light output shape of the optical lens of each of the point light sources 934 is rectangular, symmetrical in the horizontal direction while asymmetrical in the vertical direction (shown as dash-dotted rectangles in FIG. 9).

Figure 10:
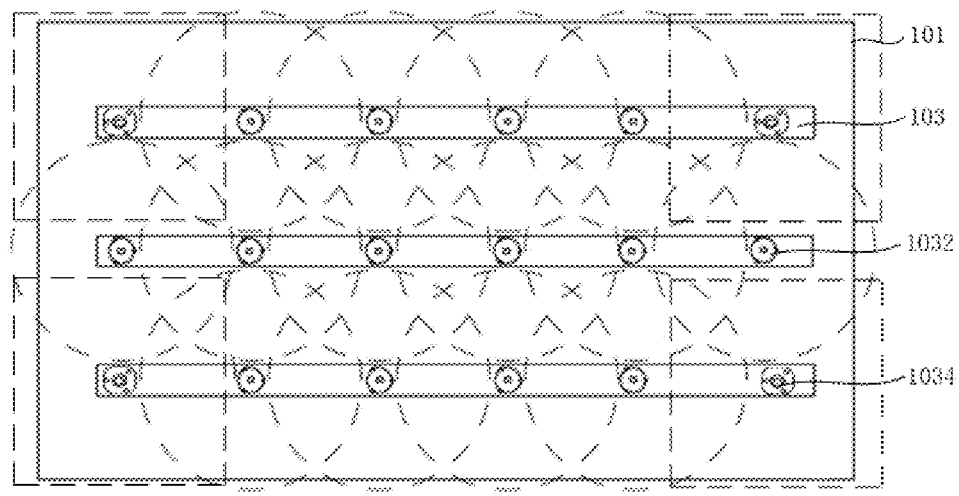
FIG. 10 is a schematic view of a light output status of still another direct-lit type backlight source provided by an embodiment of the disclosure.

Referring to FIG. 10, FIG. 10 is a schematic view of a light output status of further another direct-lit type backlight source provided by an embodiment of the disclosure. In FIG. 10, the backlight source includes a backplate 101 and three light bars 103 disposed on the backplate 101 (e.g., equally-spaced disposed on the backplate 101), each of the light bars 103 is disposed with six point light sources, and thereby form a point light source array of 3×6. The point light source array of 3×6 shown in FIG. 10 is a rectangular array, which includes four point light sources 1034 respectively located at four corners and fourteen point light sources 1032 located at the non-corner region. The point light sources 1032 each adopt the point light source shown in FIG. 2, and a light output shape of which is round (shown as dotted circles in FIG. 10). The point light sources 1034 and the point light sources 1032 adopt different optical lenses, a light output shape of the optical lens of each of the point light sources 1034 is rectangular and symmetrical in the horizontal direction as well as in the vertical direction (shown as dotted rectangles in FIG. 10), and the specific structure of the optical lens is in the understood range of the skilled in the art and thus will not be repeated herein.

Figure 11:
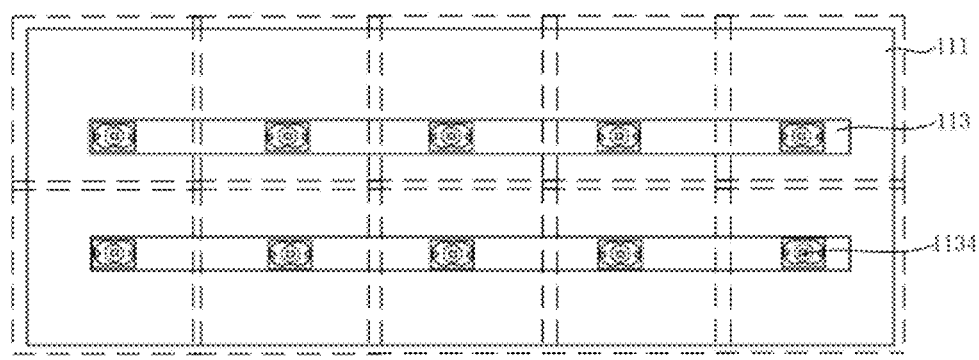
FIG. 11 is a schematic view of a light output status of even still another direct-lit type backlight source provided by an embodiment of the disclosure.

Referring to FIG. 11, FIG. 11 is a schematic view of a light output status of still another direct-lit type backlight source provided by an embodiment of the disclosure. In FIG.

11, the backlight source includes a backplate 111 and even number of such as two light bars 113 disposed on the backplate 111, each light bar 113 is disposed with five point light sources, and thereby form a point light source array of 2×5. The point light source array of 2×5 shown in FIG. 11 is a rectangular array, four corners and the non-corner region all adopt same point light sources 1134. Specifically, a light output shape of the optical lens adopted by each of the point light sources 1134 is rectangular (referring to FIG. 7) and symmetrical in the horizontal direction while asymmetrical in the vertical direction (shown as dotted rectangles in FIG. 11), the specific structure of the optical lens can be the lens structure shown in FIG. 6, the lens structure shown in FIG. 8a or other similar lens structure. Moreover, it needs to be noted that, in FIG. 11, a long side of the light output shape of the optical lens of each of the five point light sources on the first light bar is laid above, yet a long side of the light output shape of the optical lens of each of the five point light sources on the second light bar is laid below. In other words, long sides of the light output shapes of the optical lenses of the point light sources on adjacent two light bars (or named point light sources on two adjacent rows) are laid on outside of the two adjacent light bars and mutually far away, while short sides thereof are adjacent.

Figure 12:
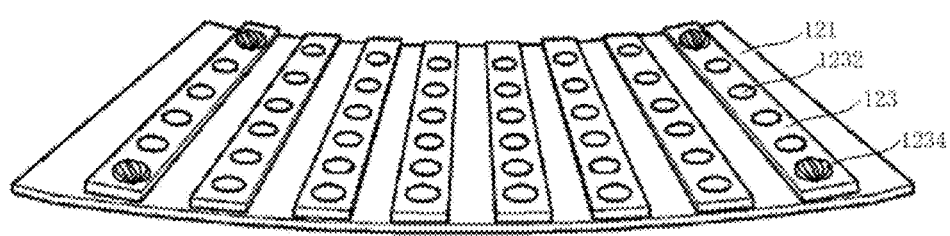
FIG. 12 is a perspective structural schematic view of a direct-lit type backlight source applied in a curved liquid crystal display device provided by an embodiment of the disclosure.

Referring to FIG. 12, FIG. 12 is a perspective structural schematic view of a direct-lit type backlight source applied in a curved liquid crystal display such as a liquid crystal television provided by an embodiment of the disclosure. In FIG. 12, the backlight source includes a backplate 121 with a certain curvature (or referred to as a curved backplate) and eight light bars 123 disposed on the curved backplate 121, each of the light bars 123 is disposed with six point light sources, and thereby forming a point light source array of 8×6. The point light source array of 8×6 shown in FIG. 12 includes four point light sources 1234 respectively located at four corners and forty-four point light sources 1232 located at the non-corner region. The point light sources 1232 each for example adopt the point light source shown in FIG. 2, whose light output shape is round. The point light sources 1234 and the point light sources 1232 adopt different optical lenses, and the optical lens adopted by the point light source 1234 may be the optical lens shown in FIG. 6 or FIG. 8a, so that the light output shape is rectangular and symmetrical in a first direction while asymmetrical in a vertical second direction. Accordingly, as the light output shape of the optical lens adopted by each of the point light sources 1234 located at respective corners in the point light source array of the embodiment is designed to be symmetrical in a first direction and asymmetrical in a second direction, four corners uncovered by the light source in FIG. 1 can be illuminated, so that optical uniformity at corners can be improved.

Moreover, it can be understood that, in FIG. 12, the point light sources 1234 are not restricted to be located at the four corners, point light sources on the leftmost first light bar and on the rightmost first light bar (i.e., edge point light sources at two ends of the curved backplate 121 on the bending direction) or even all the edge point light sources at the periphery each can be designed to be the point light source 1234, while the other non-edge point light sources each adopt the point light source 1232, which also can improve optical uniformity at corners in the prior art.

Moreover, it needs to be indicated that the amount of light bars and the point light sources on the non-corner region in each of the above embodiments are merely for the purpose of illustration, and thus are not to limit the disclosure. In other words, the amount of light bars and the point light sources on the non-corner region can be determined by a size of a liquid crystal panel in practical application.

Furthermore, an embodiment of the disclosure further provides a liquid crystal television including any one of the direct-lit type backlight sources provided by the foregoing embodiments, structures of other components in the liquid crystal television such as a liquid crystal panel are so well known to a person skilled in the art, so that detailed description will be omitted.

The above description illustrates preferred embodiments of the disclosure rather than any limitation, though the preferred embodiments are disclosed previously, the invention needs not be limited to the disclosed embodiments. For those skilled persons in the art, various modifications and variations can be made according to the concept of the invention. It is intended to cover various modifications and similar arrangements included within the spirit and scope of the appended claims which are to be accorded with the broadest interpretation so as to encompass all such modifications and similar structures.

What is claimed is:

1. A direct-lit type backlight source, comprising a backplate and a point light source array disposed on the backplate; wherein a light output shape of a first optical lens adopted by each of point light sources of a plurality of corner regions of the point light source array and a light output shape of a second optical lens adopted by each of a plurality of point light sources of a non-corner region of the point light source array are different;
wherein the light output shape of the first optical lens is symmetrical in a first direction and asymmetrical in a second direction; the first direction and the second direction are mutually perpendicular; the light output shape of the first optical lens has a long side and a short side in the second direction.

2. The direct-lit type backlight source according to claim 1, wherein the light output shape of the first optical lens is rectangular.

3. The direct-lit type backlight source according to claim 2, wherein the light output shape of the second optical lens is round.

4. The direct-lit type backlight source according to claim 1, wherein an illuminance distribution is asymmetrical with respect to a central line of the light output shape of the first optical lens.

5. The direct-lit type backlight source according to claim 1, wherein the light output shape of the second optical lens is rectangular and symmetrical in the first direction and in the second direction.

6. The direct-lit type backlight source according to claim 1, wherein the light output shape of the second optical lens is round.

7. A liquid crystal television, comprising a direct-lit type backlight source, the direct-lit type backlight source comprising a backplate and a point light source array disposed on the backplate; wherein a light output pattern of a first optical lens adopted by each of point light sources of a plurality of corner regions of the point light source array and a light output pattern of a second optical lens employed by each of a plurality of point light sources of a non-corner region of the point light source array are different;
wherein the light output shape of the first optical lens is symmetrical in a first direction and asymmetrical in a second direction; the first direction and the second direction are mutually perpendicular; the light output shape of the first optical lens has a long side and a short side in the second direction.

8. The liquid crystal television according to claim 7, wherein the light output pattern of the first optical lens is rectangular.

9. The liquid crystal television according to claim 8, wherein the light output pattern of the second optical lens is round.

10. The liquid crystal television according to claim 7, wherein an illuminance distribution is asymmetrical with respect to a central line of the light output shape of the first optical lens.

11. The liquid crystal television according to claim 7, wherein the light output pattern of the second optical lens is rectangular and symmetrical both in the first direction and in the second direction.

12. The liquid crystal television according to claim 7, wherein the light output pattern of the second optical lens is round.

13. The liquid crystal television according to claim 7, wherein the backplate is a curved backplate.

14. A direct-lit type backlight source, comprising a backplate and a point light source array disposed on the backplate; wherein light output shapes of optical lenses adopted by point light sources of a plurality of corner regions and point light sources of a non-corner region of the point light source array each are rectangular, symmetrical on a first direction and asymmetrical on a second direction perpendicular to the first direction, and wherein the first direction and the second direction are mutually perpendicular; each of the light output shapes has a long side and a short side in the second direction.

15. A liquid crystal television, comprising a direct-lit type backlight source, wherein the direct-lit type backlight source comprises a backplate and a point light source array disposed on the backplate; wherein light output shapes of optical lenses adopted by point light sources of a plurality of corner regions and point light sources of a non-corner region of the point light source array each are rectangular, symmetrical on a first direction and asymmetrical on a second direction perpendicular to the first direction, and wherein the first direction and the second direction are mutually perpendicular; each of the light output shapes has a long side and a short side in the second direction.

16. The liquid crystal television according to claim 15, wherein the backplate is a curved backplate.

17. The direct-lit type backlight source according to claim 14, wherein an illuminance distribution is asymmetrical with respect to a central line of each of the light output shapes of the optical lenses.

18. The liquid crystal television according to claim 15, wherein an illuminance distribution is asymmetrical with respect to a central line of each of the light output shapes of the optical lenses.

* * * * *